United States Patent [19]

Seme

[11] E Re. 30,324

[45] Reissued Jul. 8, 1980

[54] LETTER AND NUMBER KITS AND THE PROCESS OF PREPARING SAME

[75] Inventor: Joseph P. Seme, Walton Hills, Ohio

[73] Assignee: Sem-Torq, Inc., Bedford, Ohio

[21] Appl. No.: 892,469

[22] Filed: Mar. 31, 1978

Related U.S. Patent Documents

Reissue of:

[64] Patent No.: 3,626,616
Issued: Dec. 14, 1971
Appl. No.: 870,495
Filed: Oct. 2, 1969

[51] Int. Cl.[2] ..... G09F 7/12

[52] U.S. Cl. ..... 40/595; 40/618; 83/880; 83/883; 206/820

[58] Field of Search ..... 40/595, 594, 618, 482, 40/2 R; 29/DIG. 33; 428/600, 601; 83/883, 880, 881; 206/224, 575, 813, 820

[56] References Cited

U.S. PATENT DOCUMENTS

| | | | |
|---|---|---|---|
| 1,016,347 | 2/1912 | Matych | 83/883 |
| 1,537,321 | 5/1925 | Mayer | 40/618 |
| 1,815,632 | 7/1931 | Pannier, Jr. | 40/2 R |
| 1,924,230 | 8/1933 | Davis | 29/DIG. 33 |
| 2,019,499 | 11/1935 | Maher | 83/887 |
| 2,109,921 | 3/1938 | Leach | 428/600 |
| 2,175,260 | 10/1939 | Gollwitzer | 29/DIG. 33 |
| 2,352,339 | 6/1944 | Olney | 83/883 |
| 2,372,994 | 4/1945 | Welch | 40/2 R |
| 2,434,545 | 1/1948 | Brady, Jr. et al. | 40/2 R X |
| 2,681,732 | 6/1954 | Brady | 206/460 X |
| 3,038,597 | 6/1962 | Brady, Jr. | 206/460 X |
| 3,099,947 | 8/1963 | Pottle | 40/618 X |
| 3,130,984 | 4/1964 | Fenberg | 40/595 X |
| 3,338,395 | 8/1967 | Silverstein | 40/595 X |
| 3,496,665 | 2/1970 | Goldman | 40/618 |

OTHER PUBLICATIONS

Dennison Brochure (Dennison Manuf. Co., Framingham Mass. USA.), Price list 1966/1967, Pres-a-ply, Item 43-131 (Old #9031) & Item 43-111 (Old #9050).

*Primary Examiner*—John F. Pitrelli
*Attorney, Agent, or Firm*—Maky, Renner, Otto & Boisselle

[57] ABSTRACT

A letter and number kit for use in preparing signs or names and addresses including street numbers. The kit consists of a packet of thin metal plates, each having upper and lower longitudinally and transversely extending score lines to provide segments having a blank on one or both faces or a letter, number, or punctuation mark on one or both faces of each segment. The number of letters in the kit may be varied. Primary letters of the alphabet which are used more frequently than other letters are present in the kit in a greater number than secondary letters which in turn are present in the kit in a greater number than tertiary letters. For instance, in comparatively large kits from approximately eight to eleven of each of the primary letters, from six to seven of each of the secondary letters and from approximately two to five of each of the tertiary letters may be present.

Means including special blades are provided to respectively cut upper and lower transversely and longitudinally extending indentations or score lines to divide the plate into rectangularly-shaped segments. In both operations, blades having opposed tapered cutting edges may be provided in both the upper and lower dies of the press for separately cutting both the longitudinally and the transverse score lines on indentations and while the press is set to provide oppositely disposed upper and lower score lines in the thin metal blades, stops are provided in the lower bed of the press to prevent the blades from severing the thin metal plates, thus limiting the depth of the opposed score lines or indentations of the blades.

Circular blades having tapered peripheries may also be arranged in opposed relation on a driving and a driven shaft or on driving shafts to provide upper and lower score lines or indentations in each of the metal plates.

10 Claims, 12 Drawing Figures

| COLUMN 3 | | | | | COLUMN 4 | | | | |
|---|---|---|---|---|---|---|---|---|---|
| D | C | Q | X | Z | G | D | C | J | U |
| Y | P | N | K | H | F | E | C | H | K |
| J | F | D | X | Z | F | Q | P | H | U |
| D | C | Y | Z | J | J | V | K | V | H |
| D | F | G | H | K | P | P | N | V | N |
| F | C | J | Y | U | V | K | P | L | F |
| H | K | W | W | W | W | W | C | J | G |
| W | U | G | D | C | V | G | F | D | W |
| T | G | J | Y | W | | . | . | ' | ' |

Fig. 3

LETTER AND NUMBER KITS AND THE PROCESS OF PREPARING SAME

Matter enclosed in heavy brackets [ ] appears in the original patent but forms no part of this reissue specification; matter printed in italics indicates the additions made by reissue.

The present invention relates to packets of flat thin metal plates for use in preparing signs, each of which plates is divided by opposed upper and lower score lines or indentations into rectangularly-shaped segments, some of which segments have a blank face on one or both sides and others of which have a letter, numeral, or a punctuation mark on one or both sides of the segments. It also relates to an improved process of preparing such plates.

In providing letters and numerals for preparing signs of any desired type, such as names or names and addresses, together with the name of the street and house or rural route numbers, it is usually the practice for a retail merchant to keep a comparatively large number of letters and numerals in stock but because some of the letters of the alphabet are used much more frequently than others, they may become exhausted in which case it is necessary for him to order such letters quite frequently. When such letters are ordered individually or in small quantities, however, they are more costly than when supplied as a kit in accordance with the present invention.

It is an object of the present invention to provide a packet or kit of thin metal plates in which each plate is divided by upper and lower opposed indentations or score lines into rectangularly-shaped segments, each of which has a blank face or has a letter, numeral, or punctuation mark on one or both faces which segments may be easily snapped or broken from the plate without forming burrs or rough edges.

Another object of the invention is to provide a packet or kit of thin metal plates in which each plate is divided by upper and lower opposed score lines or indentations into rectangularly-shaped segments, each of which has a blank face or a letter, numeral, or punctuation mark upon one or both faces and in which the letters of the alphabet that occur on respective segments in the kit are present in numbers which are proportionate to their respective use in preparing signs.

A further object of the invention is to provide an improved process of scoring or indenting thin metal plates having longitudinal and transverse rows of letters or numerals, or mixtures thereof and blanks, or other data, such as punctuation marks, thereon, to a sufficient depth that the segments may be easily snapped or broken from the plate without leaving burrs or rough edges.

The invention will be better understood by reference to the accompanying drawings in which.

Figures 1, 2:
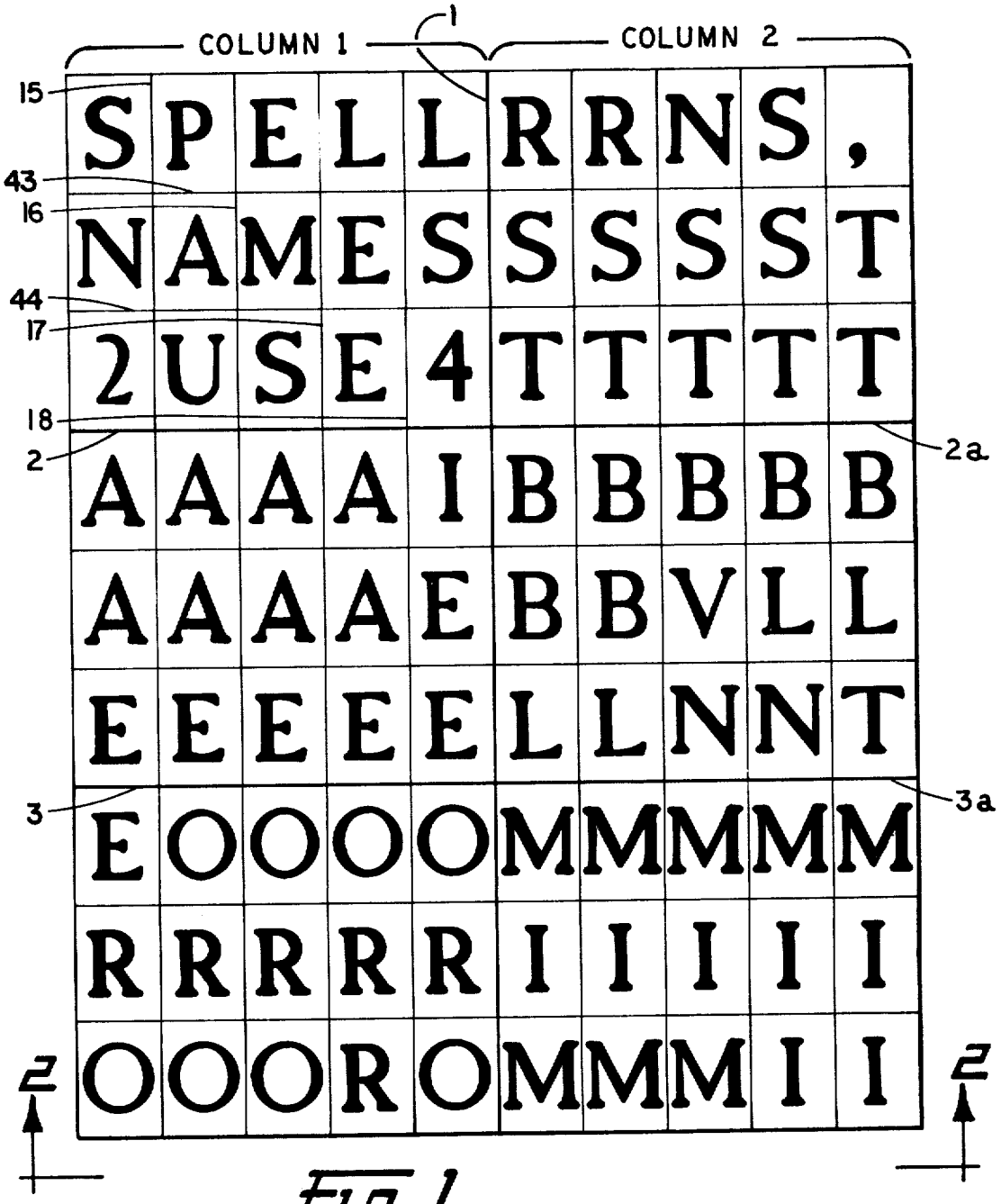
FIG. 1 is a plan view of one side of a master plate consisting of columns 1 and 2 from which six plates of my improved packet may be cut.
FIG. 2 is an end elevational view of the plate shown in FIG. 1.
Figure 4:
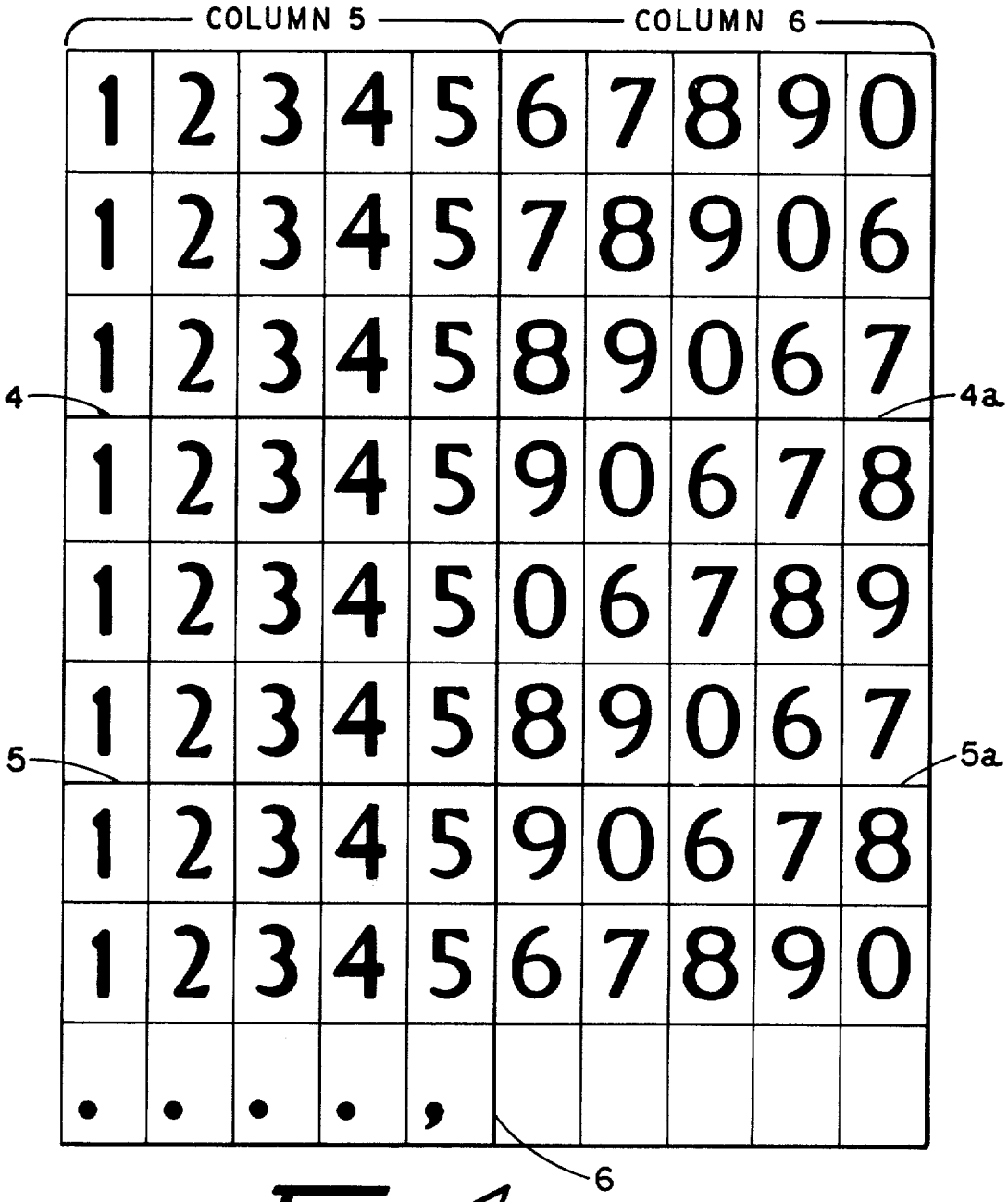
Figure 5:
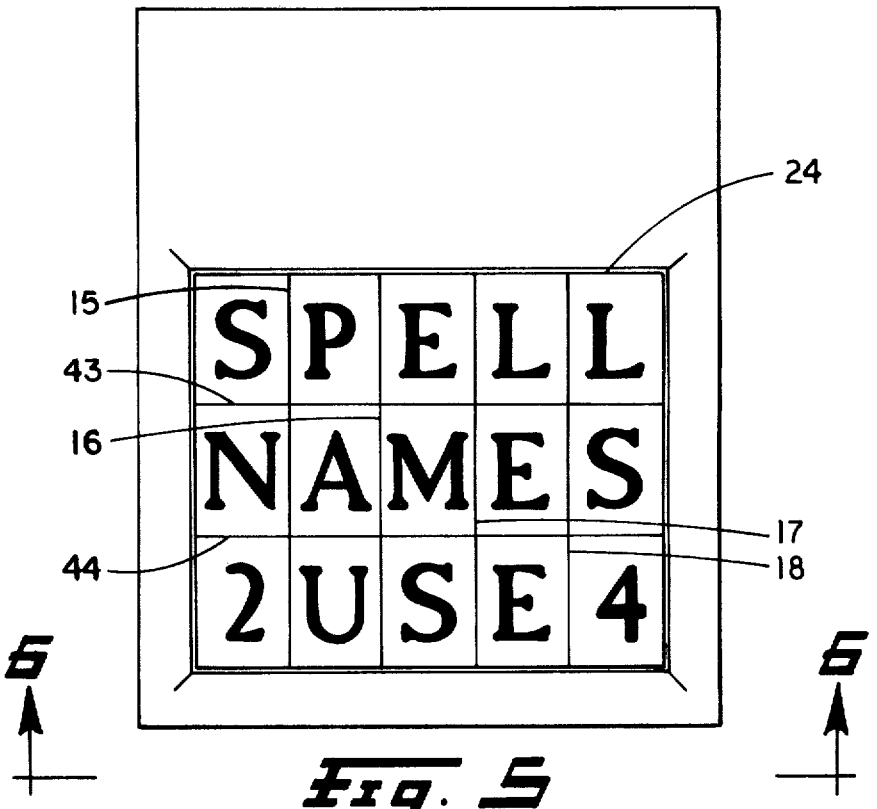
Figure 6:
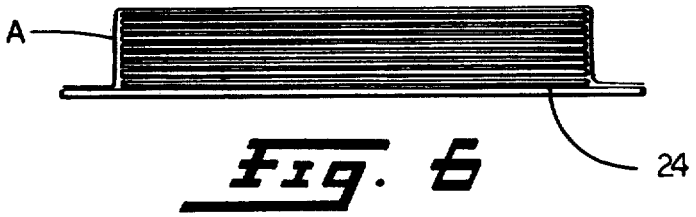
Figure 7:
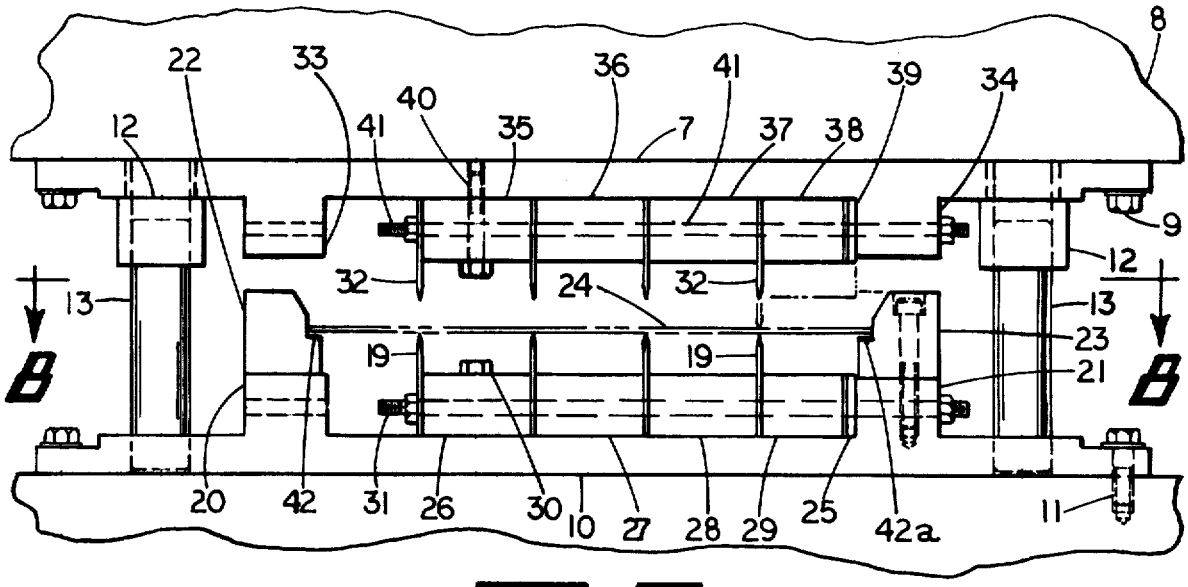
Figure 8:
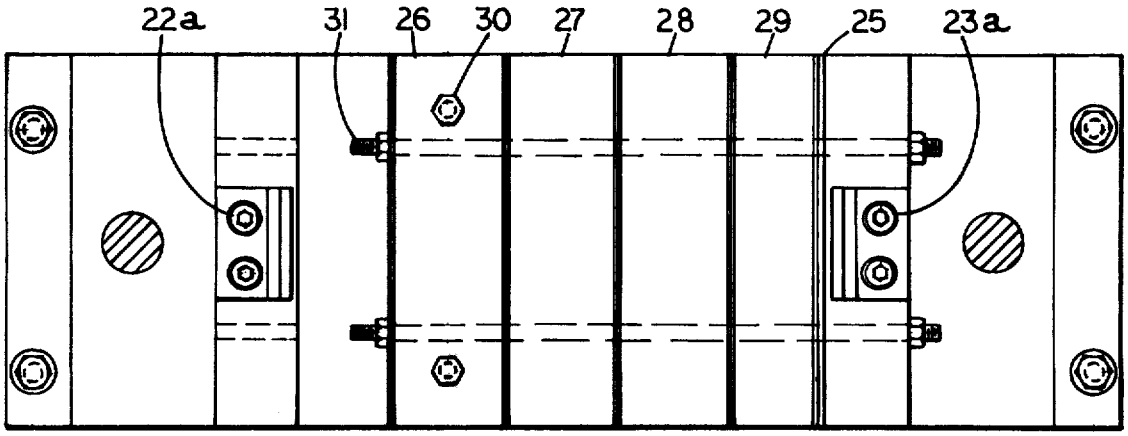
Figure 9:
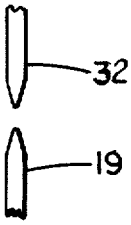
Figure 10:
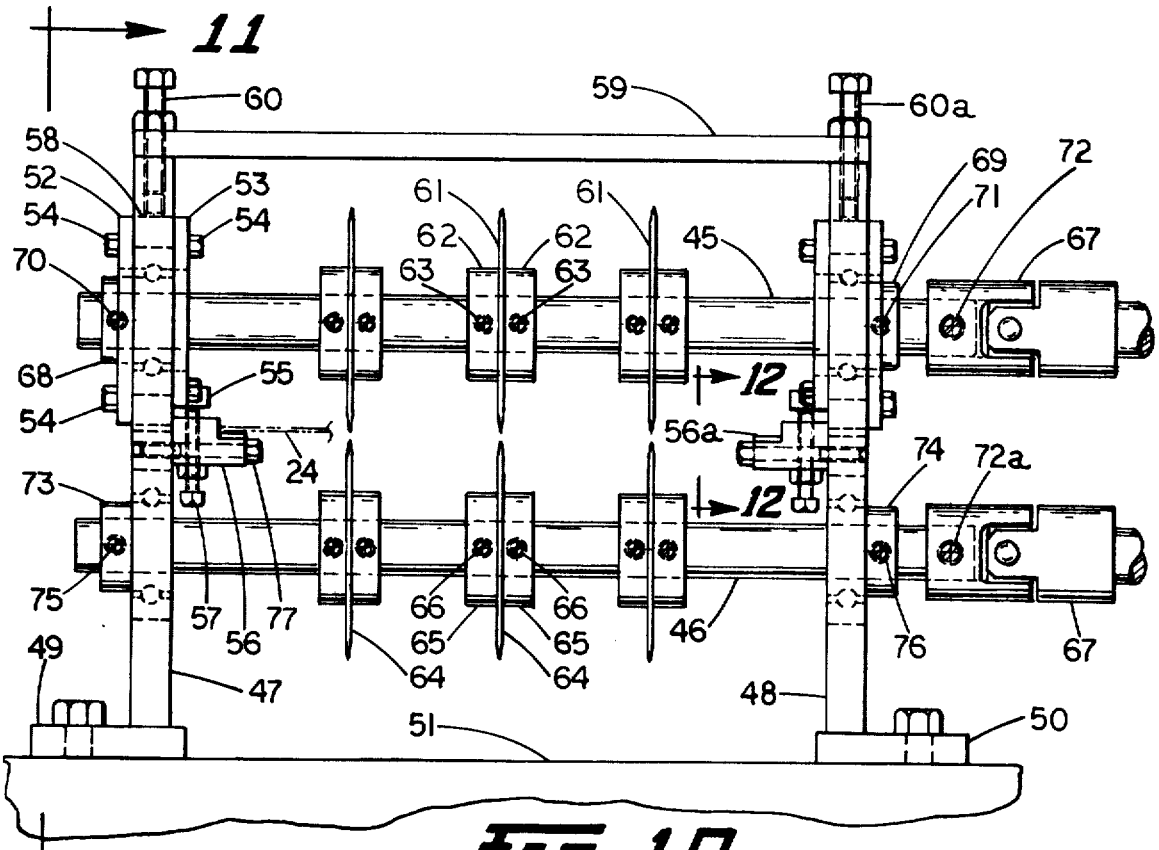
Figure 11:
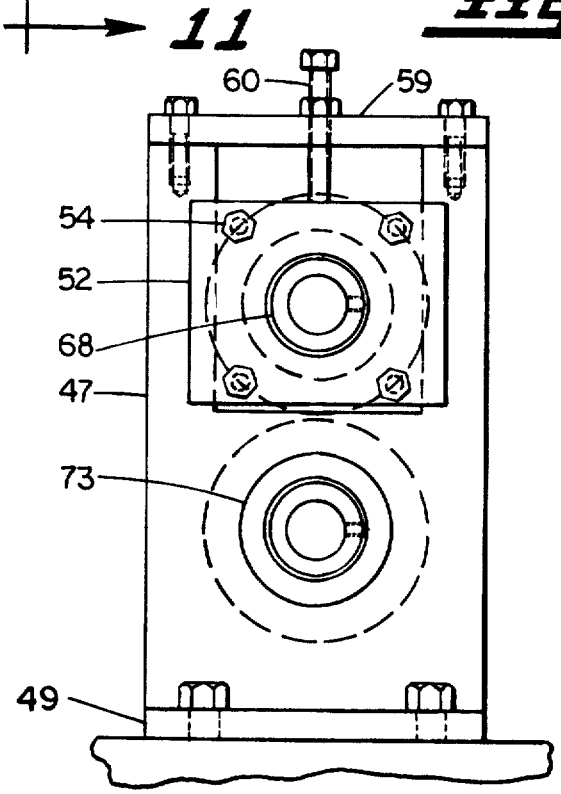
Figure 12:
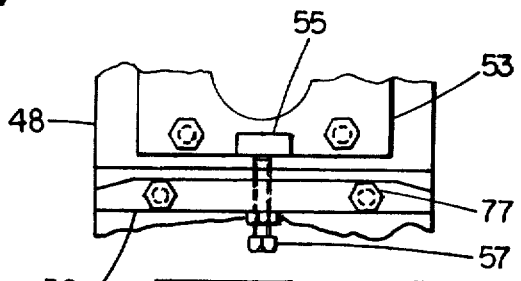

FIG. 3 is a plan view of the reverse side of the plate shown in FIG. 1 in which column 3 is the reverse side of column 1 and column 4 is the reverse side of column 2;

FIG. 4 is a master plate in which column 5 represents the front face of the plate and column 6 represents the rear face of the plate;

FIG. 5 is a plan view of a letter and numbering kit;

FIG. 6 is an end elevational view of the kit shown in FIG. 5;

FIG. 7 is a side elevational view with parts broken away of a punch press having upper and lower thin scoring blades;

FIG. 8 is a cross sectional view taken on a plane passing through line 8—8 of FIG. 7 and showing a plan view of the lower scoring blades of the press;

FIG. 9 is an enlarged view showing the shape of the opposed upper and lower scoring blades;

FIG. 10 is a side elevational view of a modified apparatus for scoring or indenting the metal of the plates to form segments;

FIG. 11 is an elevational view of the apparatus shown in FIG. 10 taken on a plane passing through the line 11—11 of FIG. 10 and looking in the direction of the arrows; and FIG. 12 is a detail elevational view taken on a plane passing through line 12—12 of FIG. 11 looking in the direction of the arrows and showing means for raising the upper shaft.

To provide a numbering and lettering kit or packet containing a larger number of those letters which are more frequently utilized in preparing names and signs than other letters, the alphabet may be divided into primary letters, secondary letters, and tertiary letters. It has been found that according to the frequency of their use in signs of various types, such as names, or names and addresses, the letters A, C, E, I, J, M, N, O, S, and T may be considered primary letters, the letters B, D, F, H, K, L, P, R, W, and V may be considered secondary letters and the letters G, Q, U, X, Y, and Z, may be considered tertiary letters. In preparing my improved kit or packet, approximately eight to eleven of each of the primary letters, approximately six or seven of each of the secondary letters, and approximately two to five of each of the tertiary letters of the alphabet are formed upon segments. When letters are provided on the opposite sides of each segment, care must be exercised not to utilize segments having all secondary or tertiary letters on the opposite side.

In each packet approximately forty pairs of kraft strips are also provided having a pressure sensitive adhesive between each pair and in the event it is desired to apply a pressure sensitive adhesive to the back of a letter or numeral, one of the thin kraft paper strips is removed, the exposed pressure sensitive adhesive, together with the other kraft strip is applied with the adhesive facing the back of the letter or numeral. The other kraft backing strip is then removed and the letter or numeral with the pressure sensitive adhesive thereon is applied to the desired object, such as a mail box, a golf club bag, luggage, boats, counters, trucks, and the like.

It will also be understood that instead of printing the letters, numerals or punctuation marks on both sides of a master plate, they may be applied to only one face of the plate and when the segments are broken off or snapped from the plate, they may, if desired, be arranged in the proper order in U-shaped grooves in a holder or bracket, or when a pressure sensitive adhesive is applied to the rear of the segment containing a numeral or letter in the manner specified, the letter or numeral may be applied to any desired object. For instance, the letters and numerals may be applied to a mail box to indicate the name and address or the rural delivery number of the owner. The kraft strips when used are coated with silicone or wax to enable them to be readily pulled from the pressure sensitive adhesive without removing the adhesive. The pressure sensitive adhesive may be of any well known type which is capable of resisting the temperature to which it is subjected in service or a mixture of a pressure sensitive adhesive and a thermally setting adhesive may be used. Numerous examples of pressure sensitive adhesive and the mixture of a pressure sensitive adhesive with a thermally setting adhesive are disclosed in Pat. No. 3,117,902 granted on Jan. 14, 1964.

To provide plates of the desired size having numerals thereon, a third master plate is provided as shown in FIG. 4, the numbers in column 5 being printed, such as by the silk screen process, on the front face of the plate and the numerals in column 6 being printed in a similar manner on the reverse side thereof. It will be noted that in column 5 all of the rows except the last one have the numerals 1, 2, 3, 4 and 5 printed thereon whereas the last row includes four periods and a comma, and in column 6 which is on the reverse side of the plate containing the numerals in column 5, all of the rows of the plate have printed thereon the numerals 0, 6, 7, 8 and 9 with the exception of the last row which consists of five blank segments. The printing of the numbers on the reverse side of the plate as shown in column 6 provides a reserve of the high numbers or the zeros in the event that a substantial number of certain numerals of the lower group are used. It will of course be understood that instead of printing the numbers shown in column 6 on the reverse side of the plate containing column 5, a separate plate may be provided upon which may be printed the numerals shown in column 6. It will also be noted that the number of each of the numerals to be utilized in the packet including the numerals 2 and 4 in column 1 of FIG. 1 provide nine of each of the numerals 2 and 4 and eight of each of the other numerals.

As previously stated, one of the objects of the present invention is to provide a packet of plates having printed on one or both sides a plurality of letters or numbers, or a mixture of letters, numbers, and punctuation marks, and including a sufficient number of blanks to enable the formation of names, names and addresses, or other signs. In accordance with my invention, the individual letters and blanks on the plates are scored or indented on opposite sides in such a manner that individual segments upon which is printed letters, numbers, punctuation marks, or which has a blank face, may be easily broken or snapped from the plate without forming rough edges or burrs and while the printing may be formed upon one or both sides of the smaller plates, for economical reasons, master plates are first prepared which are subsequently divided into smaller plates to prepare the improved packet. As shown in the drawings, one or more master plates are first prepared on which are printed a comparatively large number of letters, numerals, and punctuation marks. The master plate is then subdivided into a plurality of plates of smaller size which may be packaged and secured to a cardboard to form a letter and numbering kit as shown in FIG. 5 which has a space above the packet for receiving advertising. It is to be understood however, that if desired, the letters or numerals or mixture thereof, may be printed on one or both sides of smaller plates. As shown in FIG. 1, however, a master plate is divided into column 1 and column 2, a series of letters being printed on the plate in rows in column 1 with the exception of the third row which has two numbers and in a like manner, column 2 has printed in rows thereon a series of letters with the exception of its first row which contains a comma.

In column 4 of FIG. 3 which is on the reverse side of column 2 shown in FIG. 1, the plate contains all letters except the last row which has one blank face, two periods and two apostrophes.

Numerals for rural route or house numbers are also included in the packet. The plates consisting principally of numerals may be of a size corresponding to the size of the plates having letters thereon. For instance, each plate may contain three rows of numerals, or two rows of numerals and a row of punctuation marks as shown in column 5 of FIG. 4, or as shown in column 6 of FIG. 4, all rows have printed thereon the numerals 0, 9, 8, 7 and 6 except the last row which contains blanks. If desired, and particularly if column 6 is printed on the reverse side of column 5, the numerals in the vertical row of column 6 are arranged in staggered relation to each other as shown so that the same numeral in column 6 will not always be arranged on the opposite side of a particular numeral in column 5.

While the plates used in the packet may be of any desired size and I do not desire to be limited in this respect, to provide a packet of plates that may be conveniently hung on a peg board or on a suitable display fixture as shown in Pat. No. 3,506,137 granted Seme et al. on Apr. 14, 1970, and which is assigned to Sem-Torq, Inc., the plates are preferably of a smaller size than that shown in FIGS. 1 to 4. For convenience in printing, however, the letters, numerals, punctuation marks and blanks are preferably prepared on a comparatively large master plate and are subsequently divided into plates of a convenient size for packaging.

When column 3 is printed on the reverse side of the plate opposite to column 1 as shown in FIG. 1 and column 4 is printed on the reverse side of the plate opposite to column 2 of FIG. 1, the cutting of the master plate along the lines 1, 2, 2a, 3, and 3a will form six conveniently sized plates having principally letters thereon but one of which has two numerals thereon, a second of which has a comma thereon, and a third of which has a blank, two periods, and two apostrophes thereon, and the remaining three plates being formed entirely of rows of letters. The blanks and punctuation marks, however, may be arranged in any one or more of the rows on the plates.

When the numerals in column 6 are arranged on the reverse side of those printed in column 5, the cutting of the master plate along the lines 4 and 5 divides the master plate into three smaller plates of the desired size to fit into the packet shown in FIG. 5. As shown in FIG. 4, however, the numerals in column 6 are printed on the master plate on the same side as column 5 in which case, the master plate may be first cut along the line 6 to divide it into columns 5 and 6 and column 5 may be cut along the lines 4 and 5 to form three smaller sized plates and column 6 may be cut along the lines 4a and 5a to form three additional smaller sized plates, all of which are of the desired size to fit within the improved packet.

While I do not desire to be limited to packets having any particular number of letters, numerals, blanks and punctuation marks, as these may be widely varied although the packet evidently should contain more of the primary letters of the alphabet than the remaining letters and more of the secondary letters than the tertiary letters, as shown in the drawings, a packet made from the plates disclosed will have 172 letters, 82 numerals, 6 periods, 2 commas, 5 blanks and 2 apostrophes from which a compartively large number of names or signs may be made.

As shown in FIG. 5, the packet of plates may be protected by a transparent polymeric resin A sold under the trade name Surlyn which is tough and resistant to solvents. Surlyn D which is a copolymer of ethylene with small amounts of sodium methacrylate or methacrylic acid, and copolymers of vinylidene chloride and vinyl chloride which is sold under the trade name of Saran, may also be used.

After plates of the desired size having longitudinal and transverse rows of letters, numerals, punctuation marks, and blanks, or mixtures thereof on one or both sides of the plates have been prepared, or after master plates are first prepared having such longitudinal and transverse rows of letters, numerals, punctuation marks and blanks, or a mixture thereof on one or on both sides as shown in FIGS. 1 to 4 of the drawing which plates are then cut to the desired size for convenient packaging, means are provided for scoring or providing indentations on the opposite sides between the transverse and longitudinally extending rows on one or both sides of each plate, and while various apparatus embodying the essential features of the invention may be used for this purpose, as illustrated in FIGS. 7 and 8, a portion of a motor driven punch press is shown having an upper head plate 7 secured to the movable part 8 of the punch press by suitable means, such as screws 9, and a lower base plate 10 which is secured to the lower portion of the press by screws 11.

The upper portion of the punch press is reciprocated by a motor having the usual fly wheel associated therewith to move the upper head 7 downwardly toward and upwardly away from the base plate 10, the upper head plate 7 having oppositely spaced guide post bushings 12 which are secured by suitable means, such as welding or a press fit to the upper head plate 7 to receive spaced guide posts 13 which are secured to the lower base of the press in a similar manner.

In accordance with the present invention, means are provided for first scoring or forming indentations simultaneously on the opposite sides between the longitudinal or transverse rows of letters, numerals, punctuation marks, blanks, or mixture thereof, formed on the plates. As illustrated in FIGS. 7 and 8, means are shown for forming four transverse score lines 15, 16, 17 and 18 on the opposite sides of each plate as shown in the first column of FIG. 1. For this purpose spaced knives 19 are secured to the base plate in any suitable manner. As shown, the base plate has two upwardly extending supports 20 and 21 upon which rest blocks 22 and 23, respectively, which form abutments for the opposite end portions of the metal plate which is here designated by the numeral 24.

The knives 19 have tapered upper end portions as shown in FIG. 9 and are maintained in spaced relation from support 21 by a shim 25 and from each other by metal blocks 26, 27, 28 and 29. For securing the spacers to the bed plate and to hold them in compact relation with each other, a pair of screws 30 extend through spacer 26 which terminates within the base plate and a pair of bolts 31 extend through the support 21, and aligned apertures in the knives and spacers to hold them in their assembled position.

The upper knives 32 are secured to the head of the press in a somewhat similar manner. As shown, the head of the press is provided with downwardly extending supports 33 and 34 and the knives are maintained in spaced relation by metal blocks 35, 36, 37 and 38. Block 38 in turn is maintained in spaced relation to the support 34 by a shim 39. As shown, lock 35 is secured to the head of the press by screws 40 and by bolts 41, only one of each of which is shown. The bolts 41 extend through aligned apertures in the knives 32, the metal blocks 35, 36, 37, 38, the shim 39, and the support 34.

As illustrated in the drawing, the plate to be scored when placed in position rests upon the upper edges of the knives 19 and is tapered at its end portions which terminate a slight distance above the abutments 42 and 42a on the blocks 22 and 23 which blocks are secured to supports 20 and 21 by screws 22a and 23a.

Each of the upper knives has an upper flat edge and a tapered downwardly extending free end portion which is arranged in opposed relation to one of the upper edges of a lower knife and as the head of the press descends, the upper knives strike the thin metal blade and score or indent the upper surface of the blade between transverse rows of letters, numerals, punctuation marks, and blanks, or mixtures of one or more of them and forces the plate downwardly against abutments 42 and 42a at which time the lower knives simultaneously score the opposite side of the plate when the opposite side of the plate is blank, or between rows of letters, numerals, punctuation marks and blanks, or a mixture of one or more of them on the opposite side of the plate when letters, numerals, punctuation marks and blanks, or mixtures of two or more of them are printed thereon.

The press is so set that when the opposite ends of the plate rest upon the abutments 42 and 42a, the head of the press begins to rise before either the upper or lower knives severs the plate. The plate is thus scored or indented on opposite sides but sufficient metal still extends between the oppositely disposed score lines to provide an integral plate from which segments containing a letter, number, punctuation mark, or a blank, may be snapped or broken off without forming rough edges or burrs.

To score the plates longitudinally, a pair of upper and lower knives are provided to score or indent the lines 43 and 44 on the opposite sides of the thin metal plates. The remainder of the apparatus and the process, however, are the same as when transverse score lines or indentations are made.

It will of course be understood that by varying the size of the spacing blocks, the blades may be arranged to score plates to provide segments of larger or smaller letters, numerals, punctuation marks and blanks thereon. For scoring a plate on which larger letters are printed, the rods 31 and 41 may be extended through the apertures in the supports 20 and 33 and the length of the spacing blocks may be increased, or a press may be provided in which the distance between the lower supports 20 and 21 and the upper supports 33 and 34 and the spacing blocks are longer. It will also be apparent that by providing a larger number of knives and increasing the width of the press, a larger number of indentations between the transverse and longitudinal extending rows may be provided during a single downward movement of the press, thus enabling plates of a larger size to be utilized in the packet.

In my improved press, the depth of penetration of the score lines on opposite sides of each segment should be such that a sufficient amount of metal remains intermediate the score lines to hold the segments together. The metal between the score lines, however, must be capable of being easily broken by a slight pressure to enable each segment to be snapped off without leaving rough edges or burrs when it is desired to separate letters, numerals, punctuation marks, or blanks from a plate. Generally stated, when the metal is approximately 0.016 of an inch in thickness, the depth of the score lines on the opposite sides of the *relatively rigid* plate may range from approximately 0.003 to 0.004 of an inch and the thickness of the metal between the score lines may range from approximately 0.0001 to 0.0002 of an inch. When the metal is thinner, the score lines on the opposite sides of the plate may be as small as 0.001 of an inch.

For preparing score lines or indentations on the upper and lower sides between transverse or longitudinal rows of letters, numerals, punctuation marks or blanks, or between rows of a mixture of two or more of them, another form of my invention is shown in FIGS. 10 to 12. As shown, the apparatus includes an upper driving shaft 45 and a lower shaft 46 which may be a driving or a driven shaft. The opposite ends of each of the shafts are rotatably mounted in ball bearings in or associated with frames 47 and 48, respectively. To provide a stable structure, each of the frames has a lower outwardly extending flange 49 and 50, respectively, which may be secured to a base plate 51 by suitable fastening means, such as screws or bolts.

The upper shaft is adjustable upward and away from the lower shaft to permit plates of varying thickness to be passed between the upper and lower blades and for regulating the depth of the score lines or indentations between the rows of letters, numerals, or punctuation marks, or between two or more of them on the upper side of the plate and the depth of the score lines on the reverse side of the plate or between rows of letters, numerals, punctuation marks, or blanks, or a combination of two or more of them on the reverse side of the plate. For this purpose, the upper portion of each of the frames is provided with a central opening into which a rectangularly shaped bearing block 58 fits with its opposite sides slidably engaging the opposite sides of the opening in the frame. Each of the bearing blocks is provided with a central opening for receiving the opposite end portions of the upper shaft and a circular recess for receiving bearing balls.

To enable the upper shaft to be raised, retaining plates 52 and 53 are arranged on opposite sides of each of the upper portions of each frame through which fastening means, such as bolts 54 extend, which bolts also extend through apertures in the bearing blocks 58. Also extending inwardly from each inner retaining plate is a lug 55 and from each frame guides 56 and 56a are secured which serve to direct metal plates into the apparatus and for varying the heights of shafts 45, screws 57, which may be finely threaded to provide precision in the distance that the upper shaft may be raised or lowered, pass through the guides 56 and 56a to vary the distance of the upper shaft from the lower shaft. It will of course be understood that the bearing blocks 58 while preventing sidewise movement of the upper shaft permits vertical movement thereof and that there is a slight clearance between the bearing blocks 58 and the retaining plates 52 and 53 in each of the frames to permit upward movement of the shaft when screws 60 and 60a which pass through a frame 59 are released. To permit downward movement of the upper shaft, screws 57 may be released at which time the upper shaft may be lowered to position it at the desired distance from the lower shaft. At this time the lower screws 57 are again tightened and the upper screws 60 and 60a are threaded downwardly to maintain the upper shaft in the desired position.

For cutting transverse score lines in the plate, the upper shaft is provided with a series of blades 61, each of which has an outer tapered edge and each of which is held in place on the upper shaft by collars 62 secured to shaft 45 by suitable means, such as screws 64. In a like manner, the lower shaft 46 is provided with circular blades 64, each of which has a tapered outer periphery and each of which is held in position on the shaft 46 by collars 65 affixed to the shaft by suitable means, such as screw 66. As shown, the lower blades are arranged in vertical alignment with the upper blades.

The shafts 45 and 46 may be connected to a prime mover, such as a motor (not shown), by a universal joint 67 which permits the height of the upper shaft to be varied or if desired the upper may be connected through a universal joint to the prime mover and the lower shaft may be driven by the work as the plate is forced between the shafts. Shaft 45 may be connected to the inner races of the upper ball bearings by suitable fastening means, such as screws 70 and 71 and the upper portion of the universal joint by fastening means, such as a screw 72. In a like manner, shaft 46 is connected to the inner race of the lower ball bearings by set screws 75 and 76 and the lower portion of the universal joint by a screw 72a and to vary the spacing of the blades on each of the shafts from each other to vary the size of the segments, set screws 63 and 66 passing through each of the upper and lower collars, respectively, may be loosened or removed and the blades may be reset in aligned upper and lower relation at the desired distance from each other.

To remove one of the plates on each shaft, such as when preparing longitudinal lines 43 and 44 as shown in FIG. 1, screws 70 and 71 passing through the inner races of the ball bearings and screw 72 connected to the universal joint may be loosened or removed and the shaft moved to the left at a sufficient distance to permit the removal of one of the blades at which time the shaft may be returned to its original position and the set screws tightened or reinserted.

One of the blades may be removed from the lower shaft in a similar manner. As shown, shaft 56 may be connected to and driven by the prime mover or it may be driven through the plate being scored when the upper shaft is rotated. To remove one of the blades from the lower shaft, set screws 75 and 76 which pass through the inner races of the bearings associated with shaft 46 and the screw 72 associated with the universal joint or an outlet shaft, may be loosened or removed and the shaft moved to the left at which time one of the blades may be removed. The lower shaft may then be returned to its original position at which time the set screws 75, 76 and 72a may be tightened or reset in their original positions. The remaining upper and lower aligned blades on the upper and lower shafts may then be reset, if desired, in aligned relation to provide longitudinal score lines or indentations in the upper and lower sides of the plates which score lines may be between rows of letters or numerals, punctuation marks, and blanks, or two or more of them on one or both sides of the plate.

In my improved apparatus as shown in FIGS. 10 to 12, the plate to be scored or indented is passed or driven over guides 56 and 56a which are firmly held in place by screws 77 secured to each frame and as shafts 45 and 46 are rotated in opposite directions, the blades score or indent the plate to provide oppositely disposed upper and lower score lines or indentations formed between segments having a blank thereon or on which a letter, numeral or punctuation mark, may be printed, of sufficient depth to enable the segments to be easily snapped or broken off without forming rough edges or burrs.

What is claimed is:

1. A kit for use in preparing signs including a plurality of thin *relatively rigid* metal plates of substantial uniform thickness, each having longitudinal and transverse upper and lower score lines arranged in opposed relation to each other and dividing each of the plates into a plurality of rectangularly-shaped segments, each of which segments have a blank face or have printed thereon a letter, numeral, or punctuation mark and in which the depth of each of the opposed upper and lower score lines are limited to such an extent that thin connecting links of metal extend between segments on each plate which links have sufficient strength to hold the segments together but which are thin enough so that individual segments may be snapped from the plate without forming burrs or rough edges.

2. A kit as defined in claim 1 in which many of the segments have primary letters of the alphabet formed thereon, others have secondary letters of the alphabet formed thereon, and still others have tertiary letters of the alphabet formed thereon, and in which the number of segments that have primary letters formed thereon exceeds the number of segments that have secondary letters formed thereon, and the number of segments that have secondary letters formed thereon is greater than the number of segments having tertiary letters formed thereon.

3. A kit is defined in claim 2 in which each primary letter of the alphabet is printed on a sufficient number of segments to provide from approximately eight to eleven segments, each of which have the same primary letter thereon, from six to seven segments, each of which have the same secondary letter of the alphabet thereon, and from approximately two to five segments, each of which has the same tertiary letter of the alphabet formed thereon.

4. A kit as defined in claim 3 in which many of the segments have a primary letter formed on one face and a secondary or tertiary letter on its opposite face.

5. A kit as defined in claim 1 in which each of the metal plates of the kit has a thickness ranging up to approximately 0.016 of an inch and in which each of the opposed score lines has converging tapered faces.

6. A kit as defined in claim 5 in which the thickness of the metal between opposed score lines on each plate may range from approximately 0.001 to 0.004 of an inch depending upon the thickness of the metal.

7. In the method of preparing plates for use in a letter and number kit, the steps which comprise forming spaced numerals, letters, punctuation marks or blanks, or a mixture of two or more of such characters in longitudinal and transverse rows on a thin *relatively rigid* metal plate of substantially uniform thickness and forcing upper and lower opposing blades, each having converging outer faces into engagement with the plate between the longitudinal and vertical rows to a sufficient extent to provide thin metal connecting links between adjacent segments on the plate that have sufficient strength to hold the segments together but each of which links is thin enough so that individual segments may be snapped from the plate without forming rough edges or burrs.

8. The opposed method as defined in claim 7 in which the score lines are first cut into the thin metal plate in the spaces between the transverse rows of letters, numerals, blanks, punctuation marks, or mixtures thereof and then in the space between the longitudinal rows of letters, numerals, punctuation marks, or blanks, or mixtures thereof.

9. The method of preparing a plate as defined in claim 7 for use in a letter and number kit which comprises forming spaced numbers, letters, punctuation marks, or blanks, or a mixture of two or more of them, in longitudinal and transverse rows extending opposite to each other on both the upper and lower sides of a thin metal plate having a substantially uniform thickness ranging up to approximately 0.016 of an inch, forcing upper and lower oppositely disposed blades, each having converging faces into scoring engagement with the plate to provide thin connecting links of metal having a thickness ranging from approximately 0.001 to 0.004 of an inch between adjacent segments depending upon the thickness of the metal and which have sufficient strength to hold the segments together but which are thin enough so that individual segments may be snapped from the plate without forming rough edges or burrs.

10. The method as defined in claim 7 in which score lines are first cut into the thin metal plate in the spaces between the longitudinal rows of letters, numerals, punctuation marks, or mixtures thereof on both sides of the plate, and then in the spaces between the transverse rows of letters, numerals, punctuation marks, or blanks, or a mixture thereof, on both sides of the plate.

* * * * *